(No Model.)
J. F. MURPHY.
BICYCLE.
No. 602,034. Patented Apr. 5, 1898.
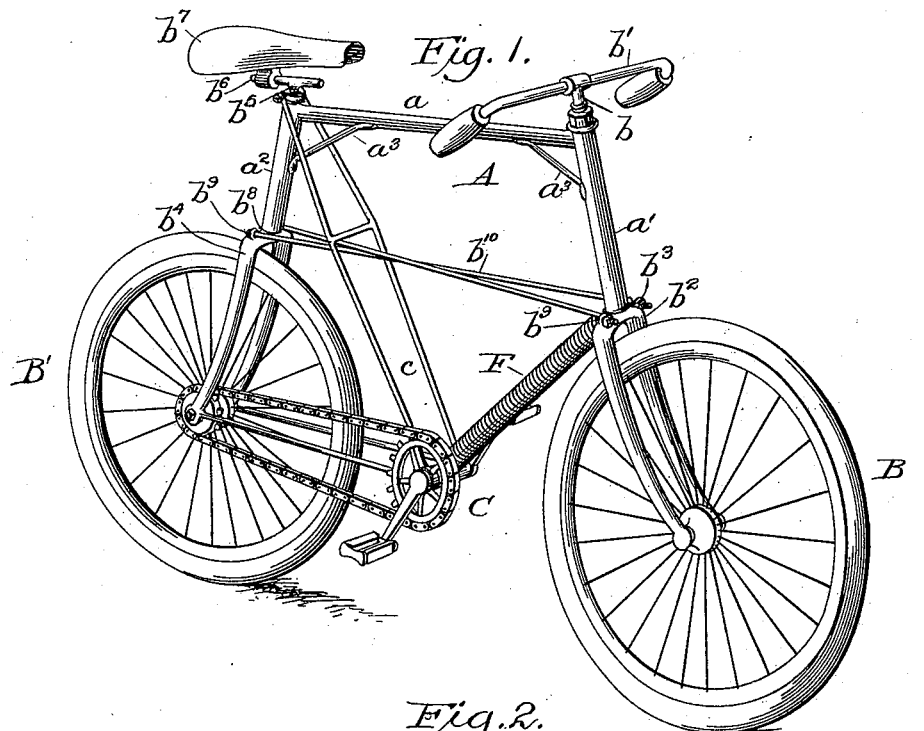
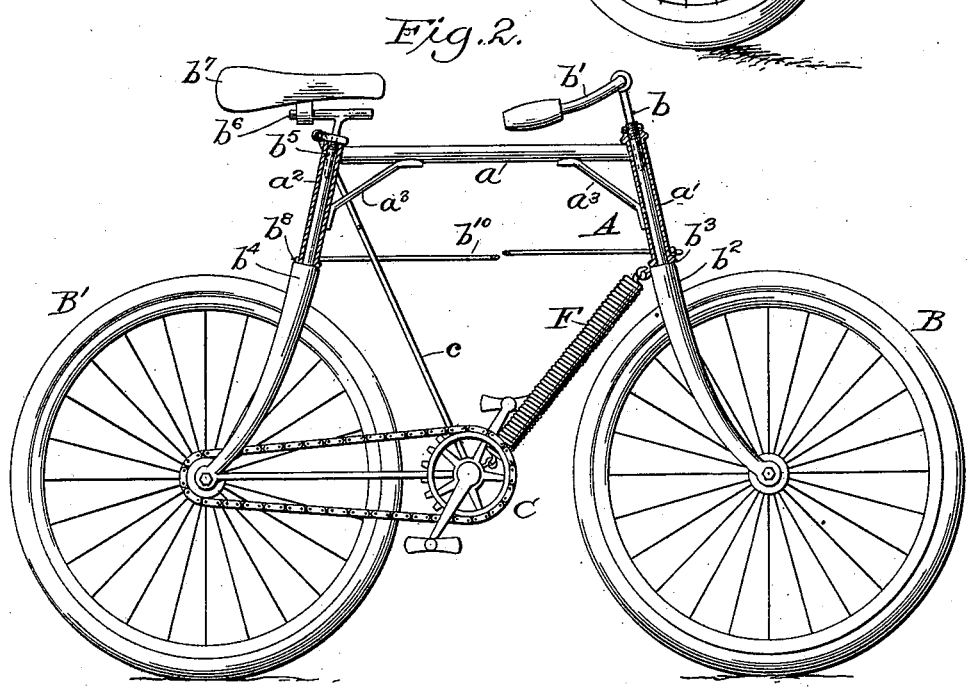
WITNESSES
James F. Duhamel
J. G. Tabler
INVENTOR
John F. Murphy
by John Wedderburn
Attorney

UNITED STATES PATENT OFFICE.

JOHN F. MURPHY, OF ADRIAN, MICHIGAN, ASSIGNOR OF TWO-THIRDS TO JAMES MURPHY AND LEWIS T. LOCHNER, OF SAME PLACE.

BICYCLE.

SPECIFICATION forming part of Letters Patent No. 602,034, dated April 5, 1898.

Application filed September 11, 1896. Serial No. 605,521. (No model.)

*To all whom it may concern:*

Be it known that I, JOHN F. MURPHY, a citizen of the United States, residing at Adrian, in the county of Lenawee and State of Michigan, have invented certain new and useful Improvements in Bicycles; and I do hereby declare the following to be a full, clear, and exact description of the invention, such as will enable others skilled in the art to which it appertains to make and use the same.

This invention relates to bicycles, and especially to the steering mechanism thereof.

The object of the invention is to provide, in connection with a suitable frame having front and rear steering-heads, two forks arranged to turn in said heads and carrying the front and rear wheels and means connecting said forks whereby they are turned simultaneously in opposite directions.

The invention consists in certain novel constructions, combinations, and arrangements of parts, all of which will hereinafter be more fully described and claimed.

In the accompanying drawings, forming part of this specification, Figure 1 represents a perspective view of a bicycle embodying my invention; and Fig. 2 represents a side elevation of the same, the steering-heads being shown in vertical section.

Referring to the drawings, A represents the frame of the machine, B and B' the front and rear wheels, respectively, and C the driving-gear.

The frame A comprises a top or upper reach-bar $a$ and front and rear reversely-inclined heads $a'$ and $a^2$, respectively. These heads are held rigidly in their inclined position in relation to the bar by corner-braces $a^3$ $a^3$. The front fork-stem $b$ passes up through the inclined head $a'$, being provided with the usual ball-bearings for securing it in position. A handle-bar $b'$ of any suitable construction has its stem fitted adjustably in the upper end of the fork-stem $b$ in the ordinary manner. The crown of the fork $b^2$ for the front wheel B is provided with angular lugs or shoulders $b^3$. The rear wheel B' is mounted in a rear fork $b^4$, and the stem of the latter passes up through the head $a^2$ in a manner similar to the fork-stem $b$ to receive the saddle-post $b^5$, having a T-head $b^6$, on which the saddle $b^7$ is mounted. The crown of the fork $b^4$ is provided with lugs or shoulders $b^8$ similar to the shoulder $b^3$ of the front fork. The lugs or shoulders $b^3$ and $b^8$ are provided with openings $b^9$ to receive the ends of crossed connecting-rods $b^{10}$ $b^{10}$. The driving mechanism C, of the usual chain-and-sprocket style, is supported in a suitable frame $c$, consisting of a pair of bottom runs connected rigidly to the fork of the rear wheel B' and inclined braces which extend from the crank-hanger upward to upper end of the rear fork-stem, said runs and braces being rigidly connected to and moving with the rear fork. A coiled spring F connects crown of fork $b^2$ and crank-hanger, so as to normally keep them in alinement and prevent excessive wabbling.

It will be observed from the foregoing description that when the front wheel B is turned in one direction to guide the machine the rear wheel B' will be turned to a corresponding degree in the opposite direction through the medium of the connecting-bars $b^{10}$, and thus the turn made by the machine will be exactly double the amount that would be made if the front wheel alone were turned.

By means of the construction set forth a very delicate touch upon the handle-bar $b'$ will have a greatly-increased effect upon the steering apparatus of the machine, and the latter can be controlled with approximately half the movement necessary when the front wheel alone is turned.

This construction is of great assistance in turning corners, enabling ruts and holes to be avoided. Instead of the rear wheel following straight on when the front wheel is turned it also turns and follows the circular path described by the front wheel, thus avoiding the rut or recess by turning about the edge of the same.

I also contemplate applying my improved steering mechanism to ladies' wheels, said application of the invention requiring only a slight alteration of the connecting-rods $b^{10}$ in order to get them out of the way of the dress of the rider.

It will be noticed that the action of the rear wheel B' is positive and that said wheel does not merely follow on in the path of the front wheel in a loose manner, but is turned from side to side by the rigid connection with the front wheel. I also contemplate employing suitable adjusting means for the rods $b^{10}$, which may consist of nuts on the ends of said rods, whereby any misalinement between the front and rear wheels may be corrected.

I do not care to limit myself to the particular formation of the frame shown, as any suitable construction now upon the market will answer equally as well, with the exception of the addition of the rear steering-head. It will also be observed that the rider may control the steering through the medium of the saddle, as well as through the front handle-bar, by reason of the saddle-post turning with the rear fork-stem.

It will be observed in my invention that the effort of steering a machine is reduced to a minimum, and a perfect balance may be sustained at all times by the slightest movement of either the handle-bar or the saddle.

Having thus described my invention, what I claim as new, and desire to secure by Letters Patent, is—

1. In a bicycle, a frame comprising front and rear steering-heads, in combination with front and rear forks having their stems received in said heads, one stem having connection with the handle-bar and the other with the saddle-post, connections between said forks for turning them in opposite directions, propelling mechanism carried by the rear fork, and a stiffening-spring connecting the front fork with the frame carrying the propelling mechanism, substantially as described.

2. In a bicycle, a frame comprising front and rear heads, in combination with front and rear forks having their stems received in said heads and having connection with the handle-bar and saddle-post, crossed connections between said forks, a crank-hanger, bottom runs rigidly connecting said crank-hanger and rear fork, braces connecting the crank-hanger and upper end of the rear-fork stem, propelling mechanism arranged to move with the rear fork and crank-hanger, and a flexible yielding connection between the crank-hanger and front fork, substantially as described.

3. In a bicycle, a frame comprising a front head and a rear head, front and rear forks having their stems arranged to turn therein, connection between said forks for simultaneously turning them in opposite directions, propelling mechanism fixed relatively to one fork, and a yielding connection between the other fork and the part of the frame carrying the propelling mechanism, substantially as described.

In testimony whereof I have signed this specification in the presence of two subscribing witnesses.

JOHN F. MURPHY.

Witnesses:
　JAMES N. KILLIN,
　HENRY C. HIFTLINE.